(12) United States Patent
Khare et al.

(10) Patent No.: US 7,526,295 B2
(45) Date of Patent: Apr. 28, 2009

(54) INTEGRATION OF SECURE IDENTIFICATION LOGIC INTO CELL PHONE

(75) Inventors: Rajendra Khare, Bangalore (IN); Sandeep Relan, Bangalore (IN); Brajabandhu Mishra, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/937,928

(22) Filed: Nov. 9, 2007

(65) Prior Publication Data

US 2008/0051117 A1    Feb. 28, 2008

Related U.S. Application Data

(63) Continuation of application No. 10/801,470, filed on Mar. 16, 2004, now Pat. No. 7,308,250.

(51) Int. Cl.
*H04Q 7/20* (2006.01)
(52) U.S. Cl. ............... 455/458; 455/411; 455/422.1; 455/425; 455/428
(58) Field of Classification Search ... 455/426.1–426.2, 455/432.442, 425, 455, 462, 458, 515–517, 455/550.1, 502, 411; 713/168–171, 182–184; 380/258–272; 370/370–328, 331–332, 338, 370/350
See application file for complete search history.

(56) References Cited

U.S. PATENT DOCUMENTS

| | | | | |
|---|---|---|---|---|
| 4,411,017 A * | 10/1983 | Talbot | ................ | 380/31 |
| 5,491,741 A * | 2/1996 | Farwell et al. | ............... | 370/347 |
| 5,889,861 A * | 3/1999 | Ohashi et al. | ................ | 380/247 |
| 5,905,944 A * | 5/1999 | Goldman et al. | ............ | 340/5.74 |
| 6,044,276 A * | 3/2000 | Goldberg et al. | ............ | 455/503 |
| 6,078,908 A * | 6/2000 | Schmitz | ....................... | 705/50 |
| 6,225,888 B1 * | 5/2001 | Juopperi | ...................... | 340/5.8 |
| 6,266,525 B1 * | 7/2001 | Peterson | ..................... | 455/410 |
| 6,668,166 B1 * | 12/2003 | Kanabar | ..................... | 455/411 |
| 6,856,802 B1 * | 2/2005 | Kinnunen et al. | ............ | 455/425 |
| 6,993,638 B2 * | 1/2006 | Ukai et al. | ................... | 711/210 |
| 7,155,222 B1 * | 12/2006 | Jain et al. | ................. | 455/435.1 |
| 7,308,250 B2 * | 12/2007 | Khare et al. | ................. | 455/411 |
| 7,333,614 B2 * | 2/2008 | Jarosinski et al. | ........... | 380/268 |
| 7,372,839 B2 * | 5/2008 | Relan et al. | ................. | 370/338 |
| 2002/0031229 A1 * | 3/2002 | Yamamoto | .................. | 380/270 |
| 2003/0210787 A1 * | 11/2003 | Billhartz et al. | ............. | 380/270 |
| 2005/0216728 A1 * | 9/2005 | Relan et al. | ................. | 713/153 |
| 2005/0239445 A1 * | 10/2005 | Karaoguz et al. | ........ | 455/414.1 |

FOREIGN PATENT DOCUMENTS

| EP | 1351536 A1 * | 10/2003 |
|---|---|---|
| WO | WO 9519593 A1 * | 7/1995 |
| WO | WO 03/065676 A1 * | 8/2003 |

* cited by examiner

*Primary Examiner*—Kamran Afshar
(74) *Attorney, Agent, or Firm*—McAndrews Held & Malloy Ltd.

(57) ABSTRACT

Presented herein are systems and methods for integrating secure identification logic into cell phones. A registration is received, wherein said registration includes an identifier identifying a mobile terminal. Information is transmitted to the mobile terminal, wherein a password is a function of the information.

7 Claims, 4 Drawing Sheets

INTEGRATION OF SECURE IDENTIFICATION LOGIC INTO CELL PHONE

RELATED APPLICATIONS

This present application is a continuation of U.S. patent application Ser. No. 10/801,470, filed Mar. 16, 2004 now U.S. Pat. No. 7,308,250, entitled "Integration of Secure Identification Logic Into Cell Phone," which is incorporated by reference herein.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Passwords are a commonly practiced security measure that prevents unauthorized users from accessing computer systems as well as identifying authorized users during an access. However, unauthorized users have used a variety of measures to ascertain the passwords of authorized users.

Once an unauthorized user has obtained an authorized user's password, the unauthorized user can access the computer system in the same manner as the authorized user. Often times, the unauthorized user accesses the computer system for malicious purposes. The activity of the unauthorized user is generally not detected until significant damage or disruptions have occurred.

Requiring authorized users to change their passwords at regular intervals can curtail, at least to some extent, the activities of unauthorized users. However, the regular interval time period is usually several weeks or months. During this time period, an unauthorized user can cause significant damage and disruption. Even if the user changes password daily, it could still not be effective to inhibit unauthorized user to do significant damage and disruption for that duration.

As a result, some computer systems use a time varying randomly generated password for each authorized user. The administrator of the computer system provides each authorized user with a device. The device includes a pseudo-random number generator that generates a code at relatively short time intervals, such as every minute. The computer system is also equipped to determine the pseudo-random number at a given time. When the authorized user seeks to access the computer system, the authorized user uses the code generated and displayed by the device as the password.

The foregoing provides for quickly changing passwords that are valid for short times. Accordingly, even if an unauthorized user does obtain a password, the password is valid for a very short time period. This significantly curtails the damage that an unauthorized user can do.

One of the well known disadvantages is associated with providing such device to an authorized user. Given the global reach of the internet, in many cases the device has to be delivered to the user via courier or mail. This can delay initial access by authorized users by several days. Additionally, when sending the device by mail, it is possible for an unauthorized user to intercept the device.

Further limitations and disadvantages of convention and traditional approaches will become apparent to one of ordinary skill in the art through comparison of such systems with the present invention as set forth in the remainder of the present application with reference to the drawings.

BRIEF SUMMARY OF THE INVENTION

Presented herein are systems and methods for integrating secure identification logic into mobile communication devices.

In one embodiment, there is presented a method for providing a password. The method comprises receiving a registration, wherein said registration includes a phone number associated with a mobile terminal; and transmitting information to the mobile terminal, the password being a function of the information.

In another embodiment, there is presented a mobile terminal comprising a transceiver, a pseudo-random number generator, a controller, and an output. The transceiver receives a seed from the remote communication device. The pseudo-random number generator generates pseudo-random numbers at regular time intervals based on the seed. The controller provides the seed to the pseudo-random number generator. The output provides passwords based on the pseudo-random numbers at regular time intervals.

In another embodiment, there is presented a communication system comprising a first node and a second node. The first node receives a seed. The second node transmits the seed, that is into a pseudo-random number generator at a predetermined mobile terminal over a paging channel.

These and other advantages and novel features of the present invention, as well as details of an illustrated embodiment thereof, will be more fully understood from the following description and drawings.

DETAILED DESCRIPTION OF THE INVENTION

Figure 1:
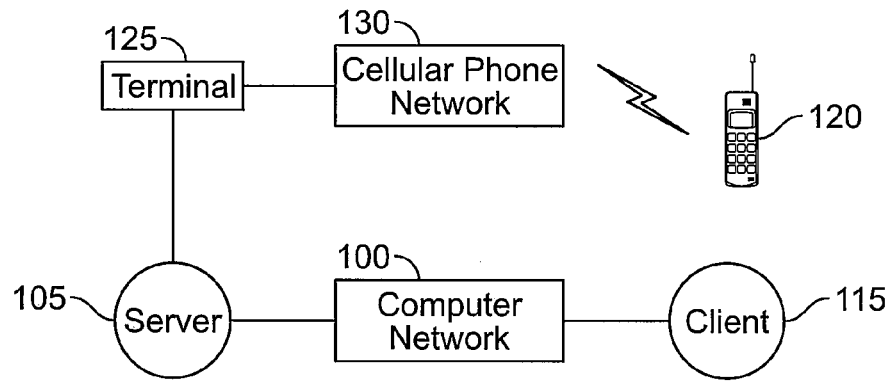
FIG. 1 is a block diagram of a communication system for configuring a mobile terminal to provide a time varying random password in accordance with an embodiment of the present invention.

Referring now to FIG. 1, there is illustrated a block diagram of an exemplary communication system for configuring a mobile terminal to provide a time varying random password in accordance with an embodiment of the present invention. The system includes a computer network 100 and a wireless phone network 150.

The communication system includes a server 105 that is accessible over a network 100 by a client terminal 115. The network 110 can comprise any combination of a variety of communication media, such as, but not limited to, the internet, the public switched telephone network, a local area network (LAN), and a wide area network (WAN).

The server 105 may provide access to a database storing sensitive information or the like, or allow individuals to perform various transactions. Accordingly, it is important to control access to the server 105. As a result, the server 105 requires a password from the client terminal 115 that validates the identity of the user at the client terminal 115.

However, unauthorized users have been known to use a variety of measures to obtain the password of an authorized user. With the password, the unauthorized user often proceeds to access the server 105 for malicious purposes.

To curtail this, the server 105 uses a time-varying pseudo-random password. A pseudo-random number generation algorithm generates the time-varying pseudo-random password at relatively short intervals, such as every minute or even less depending on the granularity required for the desired password security. Accordingly, even if an unauthorized user succeeds in obtaining an authorized user's password, the password is only valid for the remainder of the short interval.

The pseudo-random number generation algorithm can be implemented at the server 105 in one of a number of ways. For example, an Application Specific Integrated Circuit (ASIC) can also be incorporated into the server 105 that continuously runs the pseudo-random number generation algorithm. Alternatively, the pseudo-random number generation algorithm can be incorporated as software at the server 105.

The authorized user receives the time varying pseudo-random password from a mobile terminal 120. The logic that implements the pseudo-random number generation algorithm is integrated into the mobile terminal 120. This logic could either be an ASIC or a part of an ASIC present in the mobile terminal 120 or part of a software program running at the mobile terminal 120. The mobile terminal 120 displays the current time-varying pseudo-random password on its display screen. Therefore, when an authorized user seeks access to the server 105, via client 115, the authorized user provides the time-varying pseudo-random password displayed by the mobile terminal 120. The server 105 then compares the time-varying pseudo-random password provided by the authorized user to the pseudo-random number generated by the pseudo-random number generation algorithm at the server 105. The server 105 allows access, if there is a exact match.

In order for the pseudo-random number generation algorithm at the server 105 to provide the same pseudo-random numbers as the mobile terminal 120 at the same times, the pseudo-random number generation algorithms are the same and synchronized.

The pseudo-random number generation algorithm requires an input called 'seed' to generate the pseudo-random numbers. The seed can be provided by an external source to the pseudo-random number generation algorithm. The pseudo-random number generation algorithm generates the first pseudo-random number from that seed, then generates the second pseudo-random number from the first pseudo-random number thereafter, etc.

As can be seen, the sequence of pseudo-random numbers generated by the pseudo-random number generation algorithm is dependent on the seed. Additionally, different seeds to the same pseudo-random number generation algorithms result in different sequences of pseudo-random numbers. In fact, the same pseudo-random number generation algorithm can provide different time-varying pseudo-random passwords to any number of users, by assigning each user with a different seed. In order to ensure uniqueness of the sequence of pseudo-random numbers to each user, the size of the pseudo-random number generated also plays a significant role.

When a user at the client terminal 115 initially registers to access the server 105, the registration can include either a phone number or any other identification number associated with the user's mobile terminal 120. The server 105 can select a seed for the user. As an added security measure, the server 105 can select the seed based on the time of registration. The server 105 can then use a terminal 125 with access to a cellular phone network 130. The terminal 125 transmits the seed to the mobile terminal 120 using the cellular phone network 130. The terminal 125 can access the cellular phone network 130, either directly, or via a public switched telephone network.

For example, in one embodiment, the terminal 125 establishes a phone call to the mobile terminal 120. When the phone call is established, the terminal 125 can transmit audible signals over the cellular phone network 130 representing the seed. The mobile terminal 120 can accordingly, load the seed into the pseudo-random number generator at a predetermined time in synchronization with the server 105. The predetermined time is preferably proximate to the time of transmission, such as at the next minute interval, taking into consideration the path delay time of communication from server 105 to mobile terminal 120.

In another embodiment, the terminal 125 can cause the cellular phone network 130 to transmit control signals indicating the seed to the mobile terminal 120. The mobile terminal 120 can accordingly load the seed into the pseudo-random number generator at a predetermined time in synchronization with the server 105.

The cellular phone network 130 can comprise a variety of wireless telecommunications networks, such as, but not limited to, the Global System for Mobile (GSM) Communications, or the Personal Communication Services (PCS) network, Code Division Multiple Access (CDMA) network, IEEE 802.11 Wireless LAN network, Bluetooth network etc.

Figure 2:
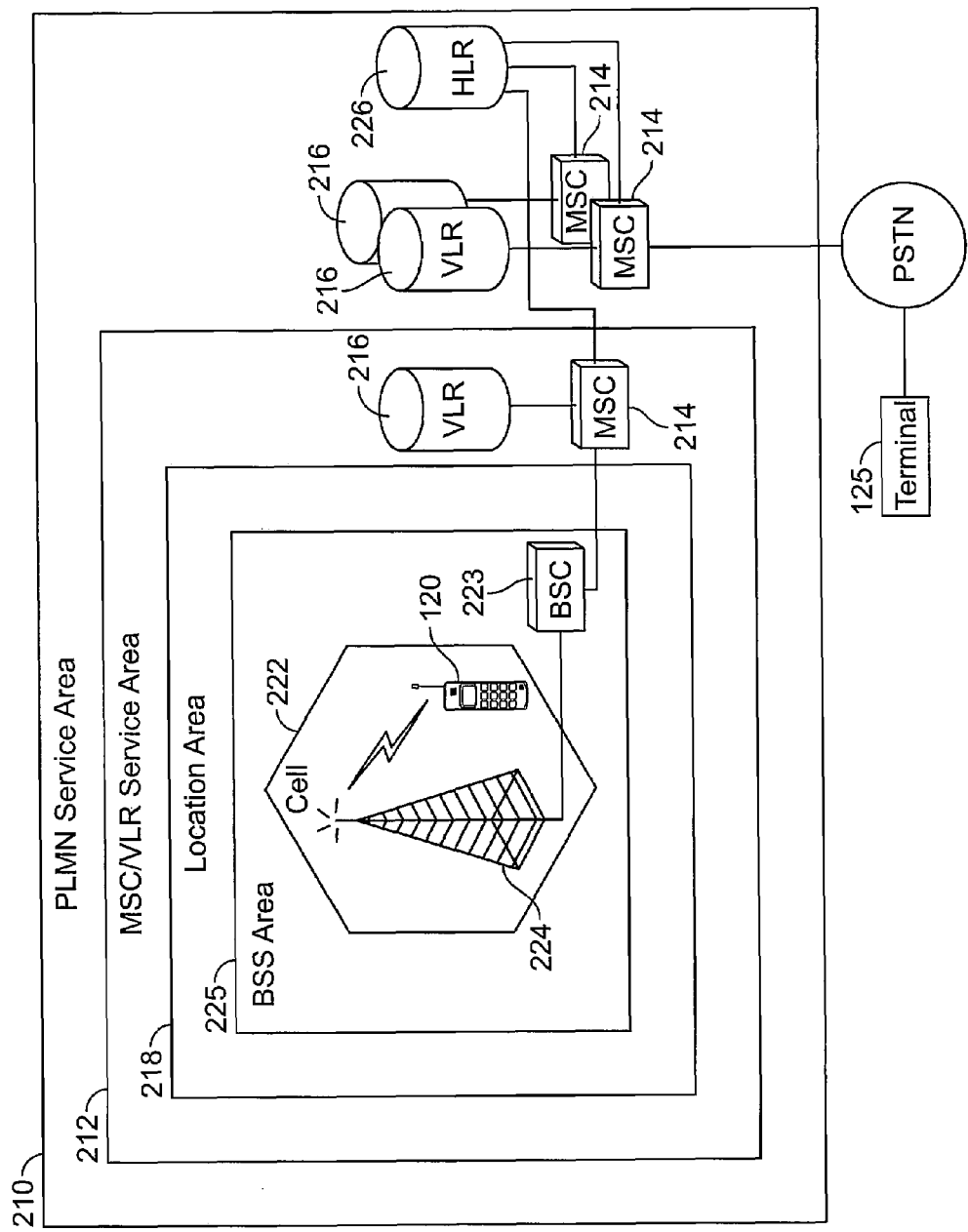
FIG. 2 is a block diagram of an exemplary Global System for Mobile Communication Public Land Mobile Network that can be used in accordance with an embodiment of the present invention.

Referring now to FIG. 2 there is illustrated a block diagram of a Global System for Mobile Communication (GSM) Public Land Mobile Network (PLMN) 210. The PMLN 210 is composed of a plurality of areas 212, each with a node known as a Mobile Switching Center (MSC) 214 and an integrated Visitor Location Register (VLR) 216 therein. The MSC/VLR areas 212, in turn, include a plurality of Location Areas (LA) 218, which are defined as that part of a given MSC/VLR area 212 in which a mobile terminal 120 may move freely without having to send update location information to the MSC/VLR area 212 that controls the LA 218. Each Location Area 212 is divided into a number of cells 222. The mobile terminal 120 is the physical equipment, e.g., a car phone or other portable phone, used by mobile subscribers to communicate with the cellular network 210, each other, and users outside the subscribed network, both wireline and wireless.

The MSC 214 is in communication with at least one Base Station Controller (BSC) 223, which, in turn, is in contact with at least one Base Transceiver Station (BTS) 224. The BTS is a node comprising the physical equipment, illustrated for simplicity as a radio tower, that provides radio coverage to the geographical part of the cell 222 for which it is responsible. It should be understood that the BSC 223 may be connected to several base transceiver stations 224, and may be implemented as a stand-alone node or integrated with the MSC 214. In either event, the BSC 223 and BTS 224 components, as a whole, are generally referred to as a Base Station System (BSS) 225. At least one of the MSCs 214 are connected to the public switched telephone network (PSTN).

The PLMN Service Area or wireless network 210 includes a Home Location Register (HLR) 226, which is a database maintaining all subscriber information, e.g., user profiles, current location information, International Mobile Subscriber Identity (IMSI) numbers, and other administrative information. The HLR 226 may be co-located with a given MSC 214, integrated with the MSC 214, or alternatively can service multiple MSCs 214, the latter of which is illustrated in FIG. 2.

The VLR 216 is a database containing information about all of the mobile terminals 120 currently located within the MSC/VLR area 212. If a mobile terminal 120 roams into a new MSC/VLR area 212, the VLR 216 connected to that MSC 214 will request data about that mobile terminal 120 from the HLR database 226 (simultaneously informing the HLR 226 about the current location of the mobile terminal 120). Accordingly, if the user of the mobile terminal 120 then wants to make a call, the local VLR 216 will have the requisite identification information without having to re-interrogate the HLR 226. In the afore-described manner, the VLR and HLR databases 216 and 226, respectively, contain various subscriber information associated with a given mobile terminal 120.

In one embodiment, the terminal 125 can establish a phone call with the mobile terminal 120 over the GSM PLMN 210, either directly or via the PSTN. Upon establishing the phone call, the terminal 125 transmits audio signals to the mobile terminal 120 causing the mobile terminal 120 to load a particular seed to the pseudo-random number generator. Alternatively, the terminal 125 can cause one of the MSCs 214 to transmit a control signal, via a base station 224 to the mobile terminal 120, causing the mobile terminal 120 to load a particular seed to the pseudo-random number generator. These are few of the many possible techniques of loading the seed to the pseudo-random number generation logic in the mobile terminal 120.

Transmitting the seed during an established call can be facilitated by the establishment of a predetermined communication protocol for secured communication between the terminal 125 and the mobile terminal 120. Such predetermined protocol can include transmission of an arbitrary control signal indicating to the mobile terminal 120 that the seed will be transmitted subsequently. Upon receipt of the foregoing arbitrary control signal, the mobile terminal 120 prepares to receive the seed and loads the seed into the pseudo-random number generator. The communication between terminal 125 and mobile terminal 120 can be made secured by employing secured communication protocols such as but not limited to, the protocols using digital certificates like Transport Layer Security (TLS) protocol, Secure Socket Layer (SSL) protocol etc.

Transmitting a control signal from a particular one of the MSCs 214 to the mobile terminal 120 may be facilitated by adapting the preexisting protocol to define commands that cause the mobile terminal 120 to load a particular seed to a pseudo-random number generator incorporated therein. For example, the MSC, 214 can transmit a command to load a seed at a particular predetermined time, along with the seed, to the mobile terminal 120 over a paging channel. For added security, a secure paging channel can be used. Upon receiving the foregoing signal, the mobile terminal 120 loads the seed into the pseudo-random number generator at the predetermined time. After receiving the seed, the mobile terminal 120 can transmit an acknowledgement to the MSC 214 using a random access channel.

Figure 3:
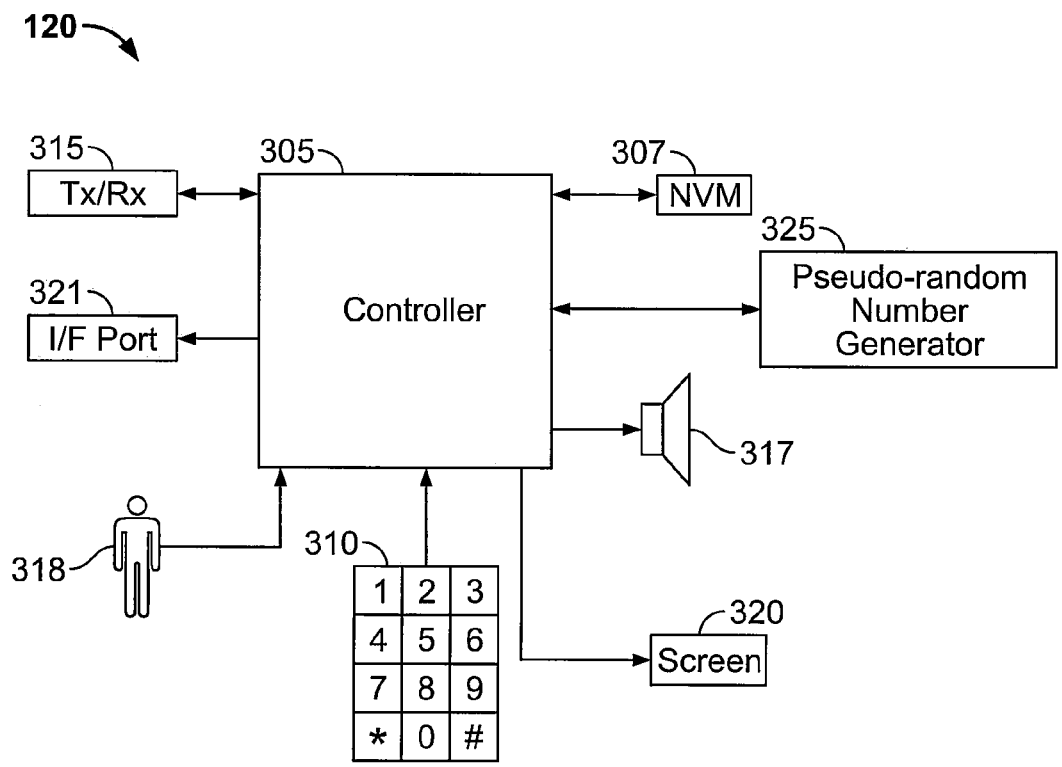
FIG. 3 is a block diagram of an exemplary mobile terminal in accordance with an embodiment of the present invention.

Referring now to FIG. 3, there is illustrated a block diagram describing an exemplary mobile terminal 120 in accordance with an embodiment of the present invention. For purposes of clarity, the block diagram is not intended as an exhaustive illustration, and certain components may be omitted.

The mobile terminal 120 comprises a controller 305, non-volatile memory 307, a keypad 310, a transceiver 315, a speaker 317, a microphone 318, an output such as a visual screen 320 or interface port 321, and a pseudo-random number generator 325. The pseudo-random number generator 325 generates a pseudo-random number at regular intervals that are controlled by a system clock 330. The controller 305 causes the current time varying pseudo-random password to be displayed on the screen 320.

The time varying pseudo-random password can be the pseudo-random number generated by the pseudo-random number generator 325. Alternatively, the time varying pseudo-random password 305 can be derived from the pseudo-random number generated from the pseudo-random number generator 325. For example, in cases where the pseudo-random number is lengthy, the controller 305 may truncate a portion of the pseudo-random number or perform other types of mathematical operations for reducing its length.

The time-varying pseudo-random password as well as a user identification can be provided in a variety of ways. In one embodiment, the time varying pseudo-random password can be output to the interface port 321. The interface port 321 can be connected to a computer such as the client terminal 115. Connecting the interface port 321 to the client terminal 115 ca cause the time varying pseudo-random password to be displayed on a screen associated with the client terminal 115. In another embodiment, the time-varying pseudo-random password can continuously be displayed on the screen 320. In another embodiment, the user may request the current time-varying pseudo-random password using the keypad 310 with the assistance of a graphical user interface provided on the screen 320.

The pseudo-random number generator 325 can comprise, for example, a circuit, such as a linear feedback shift register (LFSR), that generates pseudo-random numbers. Alternatively, the pseudo-random number generator can be implemented by a processor executing a set of instructions, wherein execution of the sets of instructions causes implementation of the pseudo-random number generation algorithm.

Additionally, there can be varying levels of integration between the pseudo-random number generator 325 and the controller 305. For example, the controller 305 and the pseudo-random number generator 325 can be separate integrated circuits that are fused together at board level. Alternatively, the controller 305 and the pseudo-random number generator 325 can be integrated together in an integrated circuit.

As noted above, the seed for the pseudo-random number generator 325 is provided by the cellular phone network 130. The mobile terminal 120 receives radio signal from the cellular phone network 130 via the transceiver 315. Various demodulation, signal processing and deciphering can be performed to recover the seed.

The mobile terminal 120 generally operates in one of two modes—a paging mode and an active mode. Generally, the paging mode is associated with the times that the mobile terminal 120 is not engaged in a phone call, while the active mode is associated with the times that the mobile terminal 120 is engaged in a phone call.

During the paging mode, the mobile terminal 120 scans a paging channel at regular time intervals for any communications from the cellular phone network 130. The communications can include for example, a request for a phone connection, a time indicator, quality of service signaling, and roaming notifications, just to name a few.

The paging channel is made secured by employing security protocols based on Public Key Cryptography technique. The example of such protocols are TLS, SSL etc. These protocols exchange digital certificates for authentication, and at the end of the authentication process a unique session key is derived which is used to encrypt the seed at the transmitter end and decrypt the seed at the mobile terminal 120.

In one embodiment of the present invention, a command is defined and an MSC 214 transmits the command, a seed, and a time over the paging channel to the mobile terminal 120. Receipt of the command by the mobile terminal 120 causes the mobile terminal 120 to load the seed into the pseudo-random number generator 325 at the provided time. Additionally, the mobile terminal 120 transmits an acknowledgment via the transceiver 315.

Accordingly, the non-volatile memory 307 can include instructions for detecting and performing the foregoing actions responsive to receiving the command. The foregoing instructions can be incorporated as part of a paging mode program.

In another mode, receipt of the command by the mobile terminal 120 can cause an interrupt in the paging mode program. The interrupt handler for the interrupt can cause the seed to be loaded into the pseudo-random number generator 325 at the provided time.

In another embodiment, the mobile terminal 120 can receive the seed during establishment of a phone call from the cellular phone network 130. As noted above, a predetermined communication protocol for communication between the terminal 125 and the mobile terminal 120 can include transmission of an arbitrary control signal indicating to the mobile terminal 120 that the seed will be transmitted subsequently. The non-volatile memory 307 can include instructions for detecting the arbitrary control signal and acting on the arbitrary control signal. Upon detecting the arbitrary control signal, the mobile terminal 120 prepares to receive the seed and a time. Upon receiving the seed and the time, the mobile terminal 120 loads the seed into the pseudo-random number generator 325 at the given time.

Figure 4:
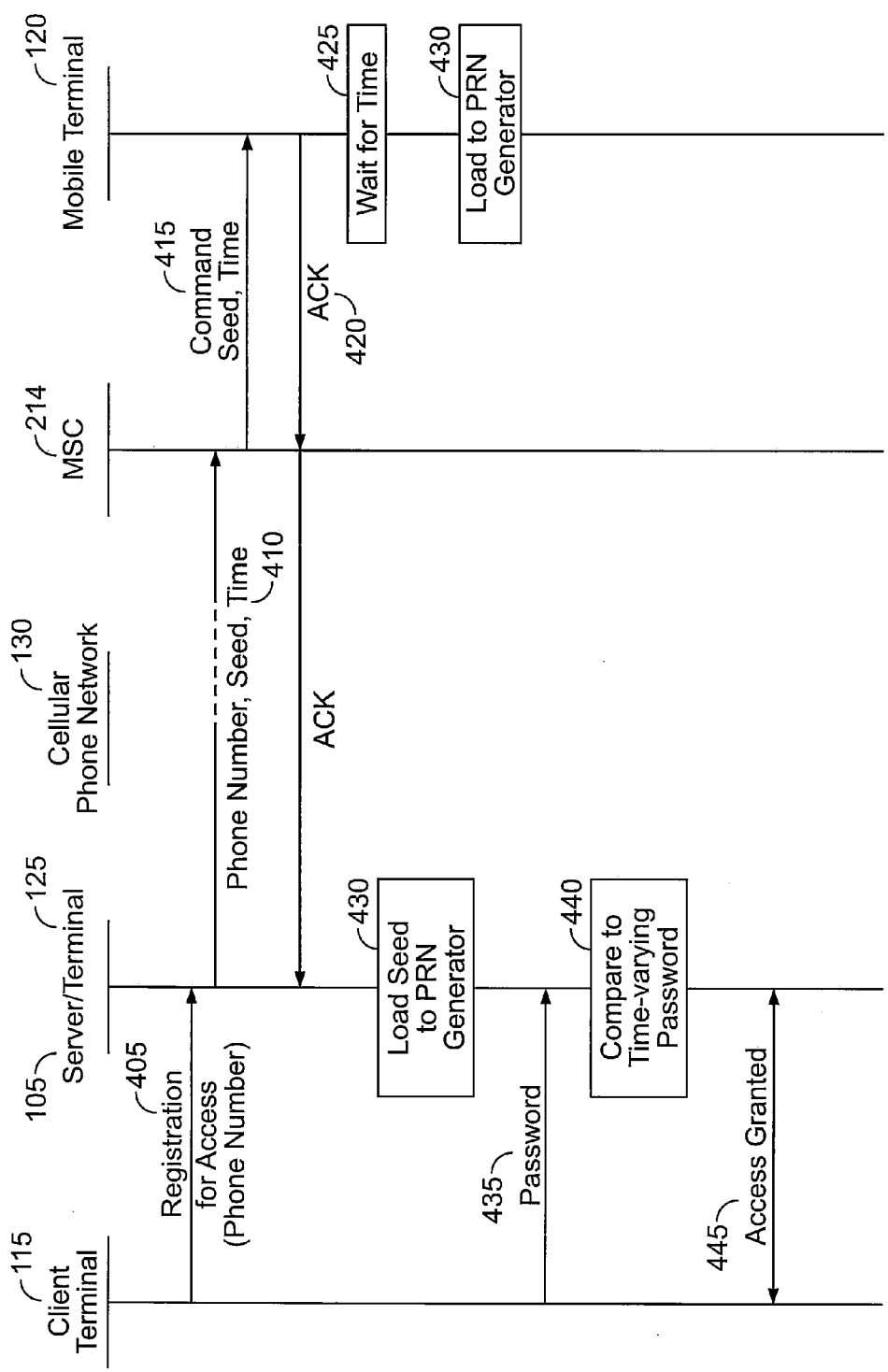
FIG. 4 is a signal flow diagram for configuring a mobile terminal to provide a time varying random password in accordance with an embodiment of the present invention.

Referring now to FIG. 4, there is illustrated a signal flow diagram for providing a seed and time to a pseudo-random number generator in accordance with one embodiment of the present invention. During the initial registration (signal 405), the user provides the phone number associated with their mobile terminal. Responsive thereto, the server 105 allocates a seed for the user and determines a synchronization time.

The server 105, via the terminal 125 transmits the phone number, a seed, and a synchronization time (signal 410) over the cellular phone network 130. The infrastructure of the cellular phone network 130 identifies and locates the mobile terminal 120 associated with the phone number, and routes the phone number, seed and synchronization time to an MSC 214 in proximity to the mobile terminal 214. The MSC 214 causes a base station to transmit the seed and the synchronization time and a command to load the seed at the synchronization time (signal 415) to the mobile terminal 120 using a paging channel.

Upon receipt of the seed and the synchronization time, the mobile terminal 120 sends an acknowledgement (signal 420) to the MSC 214 using a random access channel, that is relayed back to the server 105. The mobile terminal 120 waits for the synchronization time (425). At the synchronization time, the mobile terminal 120 and the server 105 load the seed into their respective pseudo-random number generators (430).

After the seed is loaded into the pseudo-random number generator, the mobile terminal 120 screen can display a time varying pseudo-random password. An authorized user at client terminal 115 establishes a client server connection by providing the time varying pseudo-random password (signal 435) displayed on the mobile terminal 120 screen. The server 105 compares (440) the password received from the client terminal 115 to a pseudo-random number generator at the server 105. If the foregoing match, the server grants access (signal 445) to the client terminal 115.

Figure 5:
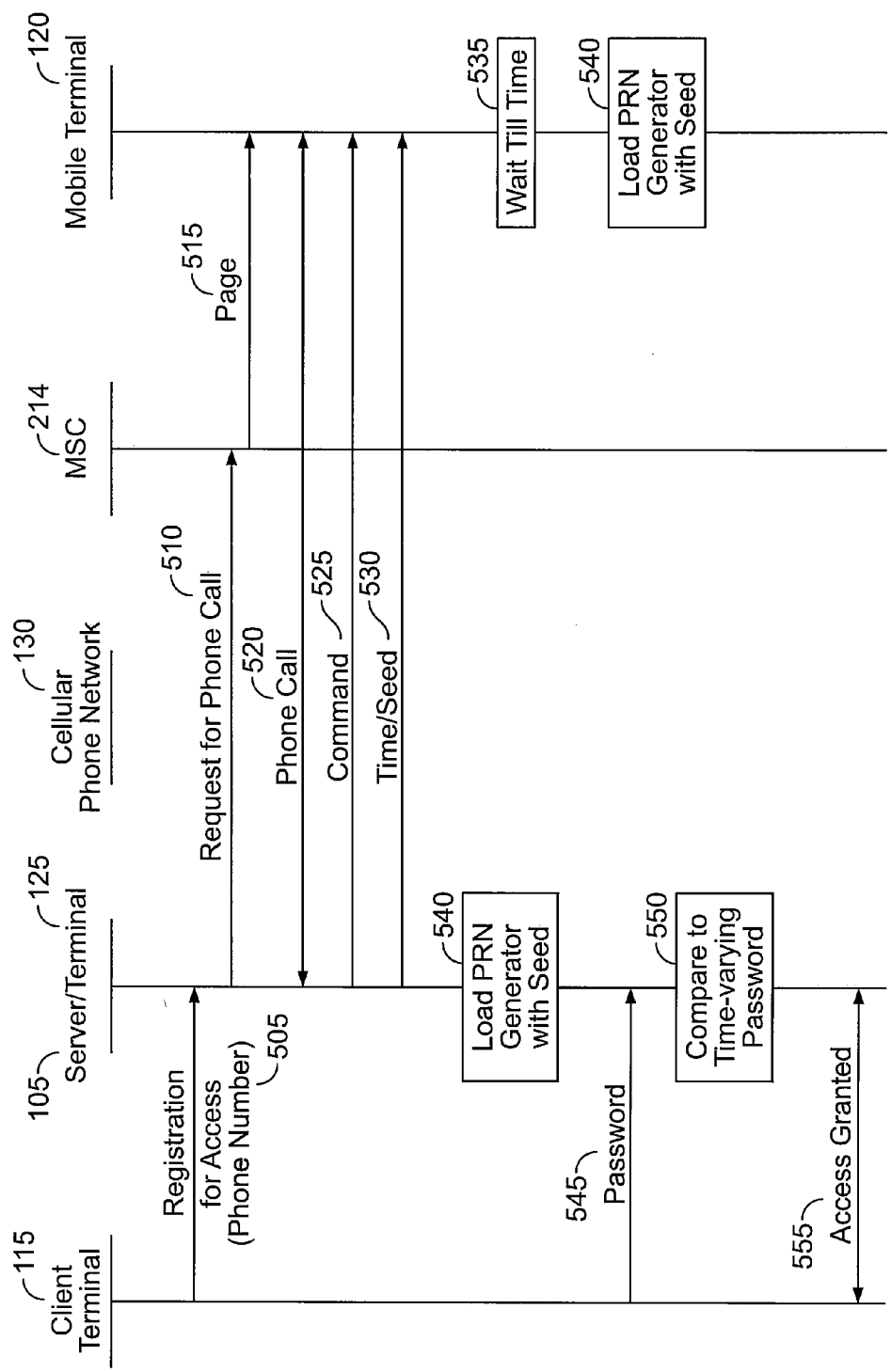
FIG. 5 is a signal flow diagram for configuring a mobile terminal to provide a time varying random password in accordance with another embodiment of the present invention

Referring now to FIG. 5, there is illustrated a signal flow diagram for providing a seed and time to a pseudo-random number generator in accordance with one embodiment of the present invention. During the initial registration (signal 505), the user provides the phone number associated with their mobile terminal. Responsive thereto, the server 105 allocates a seed for the user and determines a synchronization time.

The server 105 via terminal 125 requests an outgoing phone call (signal 510) to the phone number provided during the registration. The infrastructure of the cellular phone network 130 identifies and locates the mobile terminal 120 associated with the phone number. An MSC 214 in proximity to the mobile terminal 214 pages (signal 515) the mobile terminal 120 using a paging channel.

Upon receiving the page, the mobile terminal 120 alerts the user to answer the call. Upon the user's answer, a phone call is established between the server 105/terminal 125 and the mobile terminal 120. The server 105/terminal 125 transmits audio signals indicating a command (signal 525) to load the subsequent seed at the indicated time (signal 530).

The mobile terminal 120 waits (535) until the provided synchronization time 535 and loads (540) the seed into the pseudo-random number generator. Likewise the server 105 loads (540) the seed into a pseudo-random number generator, thereat.

After the seed is loaded into the pseudo-random number generator, the mobile terminal 120 screen can display a time varying pseudo-random password. An authorized user at client terminal 115 establishes a client server connection by providing the time varying pseudo-random password (signal 545) displayed on the mobile terminal 120 screen. The server 105 compares (550) the password received from the client terminal 115 to a pseudo-random number generator at the server 105. If the foregoing match, the server grants access (signal 555) to the client terminal 115.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A communication system comprising:
    a first node for receiving a seed; and
    a second node for transmitting the seed and a command to a predetermined mobile terminal over a paging channel, said command to load the seed into a pseudo-random number generator at the predetermined mobile terminal.
2. The communication system of claim 1, wherein the first node receives a synchronization time and wherein the second node transmits the synchronization time to the mobile terminal over the paging terminal.

3. The communication system of claim 1, wherein the first node for receiving the seed comprises a mobile switching center for receiving the seed.

4. The communication system of claim 3, wherein the second node comprises a base transceiver station.

5. The communication system of claim 1, wherein the second node receives an acknowledgement from the mobile terminal.

6. The communication system of claim 5, wherein the first node receives the seed from a source and transmits the acknowledgement to the source.

7. The communication system of claim 1, wherein the communication channel between the first node and the second node is made secured using Public Key Cryptography technique.

* * * * *